Figure 4:
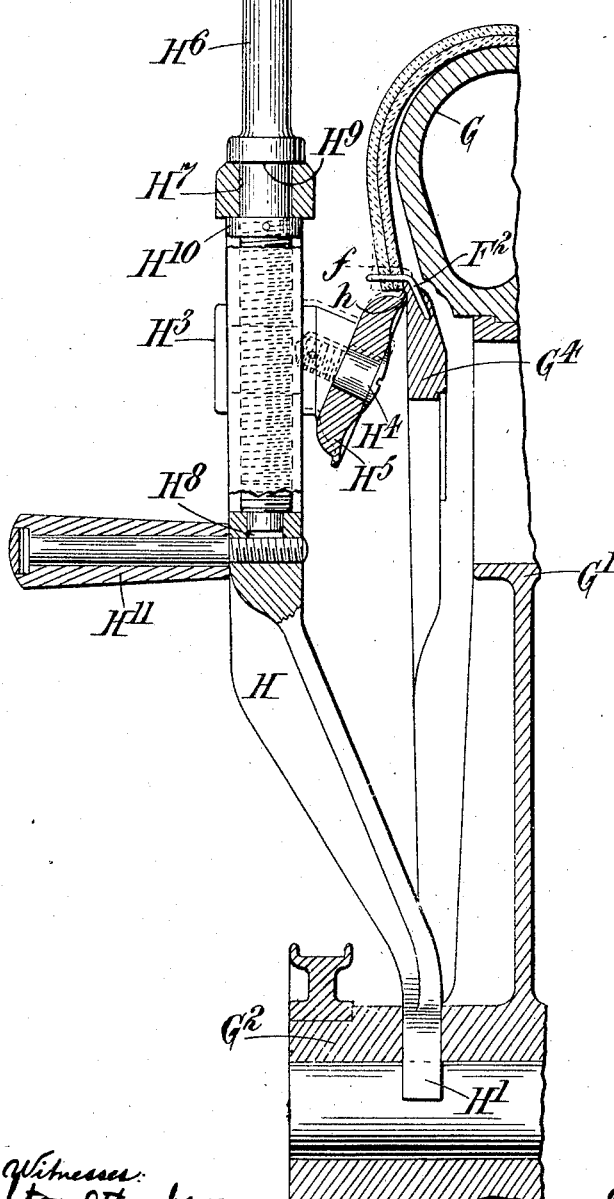

T. SLOPER.
MECHANISM FOR MANUFACTURING PNEUMATIC TIRES.
APPLICATION FILED AUG. 14, 1909.
983,408.
Patented Feb. 7, 1911.
3 SHEETS—SHEET 1.
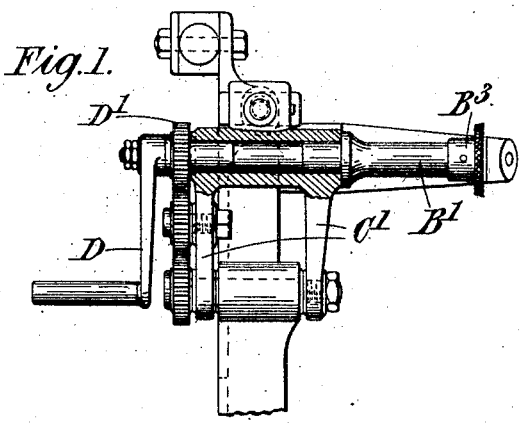
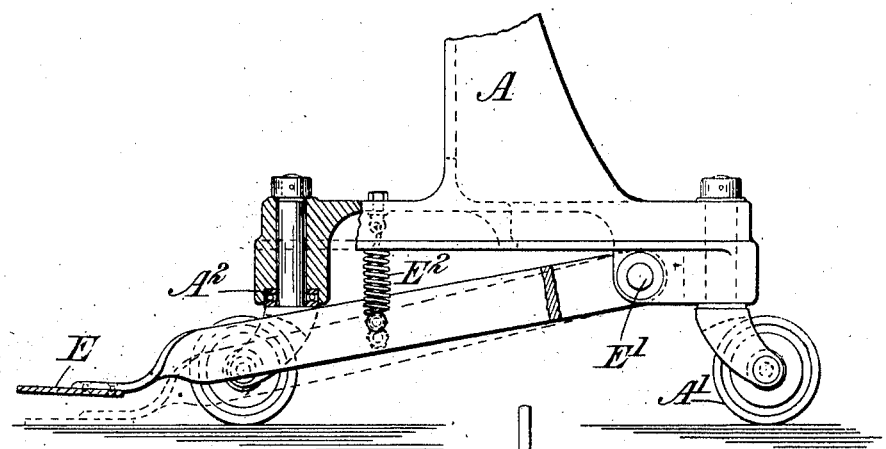
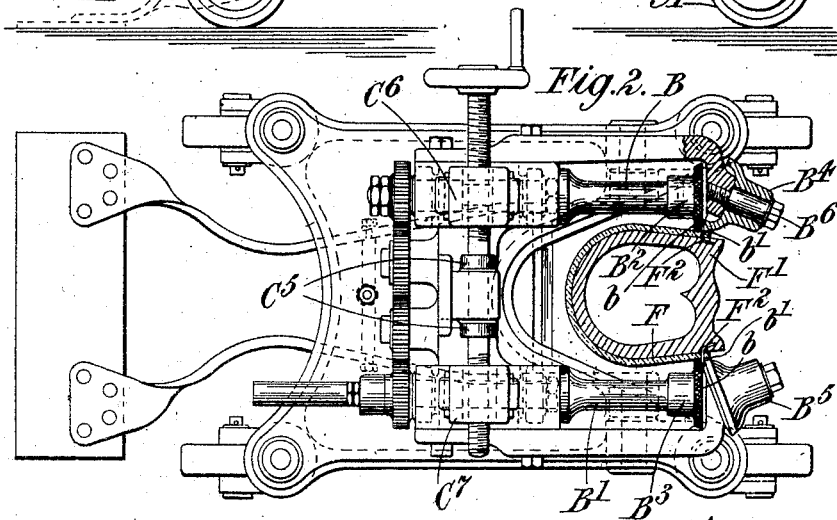

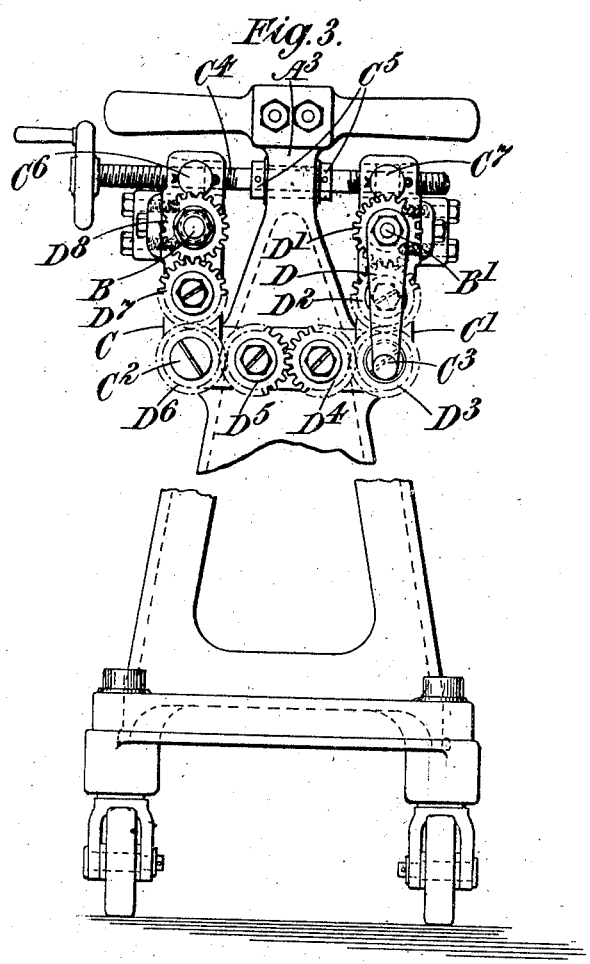

T. SLOPER.
MECHANISM FOR MANUFACTURING PNEUMATIC TIRES.
APPLICATION FILED AUG. 14, 1909.

983,408.

Patented Feb. 7, 1911.

3 SHEETS—SHEET 3.

Witnesses:
Milton Ottenberg
L. T. Hoskinson

Inventor.
Thomas Sloper,
by Foster, Freeman, Watson & Coit,
Attorneys.

UNITED STATES PATENT OFFICE.

THOMAS SLOPER, OF DEVIZES, ENGLAND.

MECHANISM FOR MANUFACTURING PNEUMATIC TIRES.

983,408.  Specification of Letters Patent.  Patented Feb. 7, 1911.

Application filed August 14, 1909. Serial No. 512,925.

*To all whom it may concern:*

Be it known that I, THOMAS SLOPER, a subject of the King of England, residing at Devizes, in Wiltshire, England, have invented certain new and useful Improvements in Mechanism for Manufacturing Pneumatic Tires, of which the following is a specification.

This invention is for mechanism for manufacturing pneumatic tires and has particular reference to the building of cord tires wherein the cords are placed around staples or pins (hereinafter referred to as pins) disposed at what finally constitute the edges of the tire, and which pins are employed to anchor the cords to the beads, although the invention would apply to the manufacture of any tire wherein the material is placed over one or more rows of pins. As is well known the pins for this purpose are carried by a support or "former" which is preferably circular in form and is rotatably mounted. Each pin is held friction-tight in the "former" and is sufficiently firm to permit the building up of the tire, but when thrust is applied to the material built around the pins in the axial direction of that part of the pins which engages the "former," these are forced out from the "former" and the material with the pins therein is thus released. It is found that after laying the cord or other material of which the cover is to be formed over the pins so that they extend through and project beyond the material, it requires to be driven home over the pins, and for this purpose it is necessary to apply pressure to the material close up against the pins, the thrust being in the direction of the axes of that part of the pins that projects on the side to which pressure is applied, and the mechanism for effecting this constitutes one part of this invention. After the material has been built up on the pins it is necessary to remove the latter from their support or "former," and the mechanism for doing this has features in common with that for pressing the material home upon the pins and constitutes another part of the invention.

Broadly the invention consists in the employment of a roller whose lip or edge is made to bear upon the tire in close proximity to the pins, the thrust being applied in a direction approximately parallel to that part of the pins that is disposed on the side to which the thrust is applied and mechanism is preferably provided for rotating the roller and thereby causing it to traverse the material. In the preferred construction of mechanism for pressing home the material, opposed rollers are used that press upon the tire while it is upon the "former," one roller being applied on each side of the "former." To remove the material from the "former" a stripper, that is conveniently in the form of a roller, is employed. This is carried on an arm that is adapted to engage a central guide on the "former," so that by swinging the arm the stripper can be made to traverse the edge of the tire. The stripper is adjustable endwise upon the arm and by means of this adjustment pressure in an approximately radial direction is applied to the tire, and the pins, which hold the tire to the "former," are thus disengaged from the same.

Figure 5:
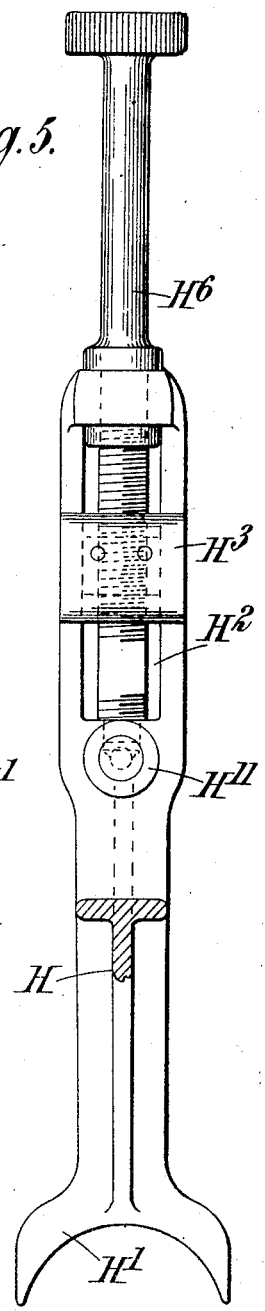

In the accompanying drawings which illustrate one method of carrying out this invention:—Figure 1 is a side elevation in part section of the mechanism for pressing home the first layer of material; Fig. 2 is a plan of the same; Fig. 3 is a front elevation of the same; Fig. 4 is a side elevation of the stripping device as applied to a "former," and Fig. 5 is a front elevation of the same.

Like letters indicate like parts throughout the drawings.

The mechanism for pressing home the material is carried upon a portable frame or standard A having four wheels $A^1$ mounted on casters $A^2$ so that the whole can be readily wheeled up to the tire to be operated upon. In arms on this frame parallel spindles B, $B^1$ are rotatably mounted, one of which carries a roller $B^2$ and the other a roller $B^3$. Each roller is fast upon its spindle and the spindles are adapted to be driven by mechanism hereinafter described. The working faces $b$ of the rollers $B^2$ $B^3$ are opposed to each other and two other rollers $B^4$ $B^5$ which coöperate with the first are disposed one beside each of the rollers $B^2$ $B^3$. These rollers $B^4$ $B^5$ are carried on obliquely disposed studs on the frame A as shown at $B^6$ Fig. 2, whereon they are free, so that these are idle rollers as compared with the rollers $B^2$ $B^3$ which are driven by their spindles B, $B^1$. The operative portions of the working faces $b^1$ of the idle rollers are arranged to lie in the same plane as the operative portions of the working faces $b$ of the driven rollers, but a gap is left between the working faces of the companion rollers so that each driven roller coöperates with its idle roller after the manner of a single circumferentially divided roller.

The spindles B, B¹ are carried on arms C, C¹ respectively that are pivoted one to turn about a pin C² in the standard A, and the other about a pin C³ in the standard. It will be seen that the pins about which these arms swing are below the spindles B, B¹ but parallel with the same so that movement of the arms will bring the rollers B² B³ nearer to or farther from each other. To control the arms a spindle C⁴ is employed; this has a bearing at A³ in the upper portion of the standard A and is prevented from endwise movement by collars C⁵. The ends of the spindle are screw-threaded, one right-handedly and the other left-handedly and these threaded portions pass through screw-threaded orifices in cross pins C⁶ C⁷ that are carried in the ends of the arms C, C¹ and are free to rock therein about axes at right angles to the axis of the spindle C⁴.

On that end of the spindle B¹ that is remote from the end whereon the roller B³ is mounted is an operating handle D and by turning this handle the spindle can be rotated. Fast on the same end of the spindle as the handle is a spur-wheel D¹ which, through the medium of a spur-wheel D² (carried by the arm C¹) has operative connection with a third spur-wheel D³. The wheel D³ is carried by the pin C³ about which the arm C¹ swings so that free movement of the arm is permitted without interfering with the meshing of this wheel with the wheel D² or a fourth wheel D⁴ on the standard. The wheel D⁴ through the medium of a wheel D⁵ also on the standard, has operative connection with a sixth wheel D⁶ on the pin C² about which the arm C swings. Thus the swinging of the arm C does not interfere with the meshing of the wheel D⁶ with the wheel D⁵ or with a wheel D⁷ on the opposite side of it and carried by the arm C. The wheel D⁷ meshes with a wheel D⁸ fast on the spindle B of the roller B². It will thus be seen that rotation of the spindle B¹ insures corresponding rotation of the spindle B.

At the base of the machine a foot-plate E is hinged at E¹. A spring E² whereof one end is connected with the foot-plate and the other end to the base of the standard A of the machine, normally maintains the foot-plate off the ground as shown in full lines in Fig. 1.

The operation of this machine is as follows:—The tire shown at F, Fig. 2, is built up on an annular mandrel or "former" F¹, part of which is shown diagrammatically in cross section in the figure referred to. The pins F² whereon the tire is built are detachably secured in the sides of the "former" and project beyond the material as shown. The "former" may be carried on a portable stand similar to that whereon the rollers B, B¹ are carried, in which case it may be advanced to the rollers if desired, or it may be carried on a fixed stand in which case the rollers are brought to it when required by wheeling the standard A into such position that the "former" enters the space between the rollers B² B³ which are sufficiently wide apart at the commencement of operations to readily receive it. Having adjusted the standard so that the pins F² aline with the space between the rollers B² B⁴ and B³ B⁵, the two pairs of rollers are advanced toward each other by rotating the right and left-hand screw-threaded spindle C⁴. The rotation of this spindle draws the arms C, C¹ together, swinging them about the pivots C² C³. The rollers having been so adjusted as to bear with sufficient force upon the material, the foot-plate E is depressed by the operator so that the whole apparatus is rendered steady and the handle D is then rotated. This causes the roller B³ to be rotated by means of its direct connection with the handle through the spindle B¹ and the roller B² is rotated in the reverse direction through the medium of the wheels D¹, D², D³, D⁴, D⁵, D⁶, D⁷, D⁸. The rotation of these rollers causes the "former" to rotate upon its support and thus each roller traverses the edge of the fabric throughout in close proximity to the pins and presses the material home upon the pins. The coöperating rollers B⁴ B⁵ rotate upon their fixed studs through being in contact with the surface of the material and serve to press home that part of the material which lies on the opposite side of the pins to that occupied by the rollers B² B³. It will be understood that this operation can be performed in a very short space of time by this apparatus and after the operation the whole mechanism can be wheeled away leaving the "former" free to have a further layer of material placed thereon. Obviously each pair of rollers operates as one and may be considered as a double or compound roller having opposed lips b b¹ which perform their functions on opposite sides of the pins.

When sufficient material has been built up on the "former" it has to be detached from the "former" by withdrawing the pins so that they come away with the material. For this purpose the tool shown in Figs. 4 and 5 is employed. In Fig. 4 part of the "former" is shown in central vertical section, and as will be seen it comprises an annular portion G that is detachably carried on a central support G¹. This support is provided with a hub G². At each side of the "former" is detachably secured a ring G⁴ (one only being shown in the drawing) and each ring has secured in its periphery a series of the pins F² already referred to. The "former" is of known construction and therefore need not be further described in the present specification as it constitutes no part of the present invention. In the drawing the ring G⁴ is shown as detached from the "former" in order that the stripping tool may do its work. This tool comprises an arm H that is forked at its lower end at H¹ and is slotted at H² to receive a sliding block H³. The block carries a pin H⁴ whereon a stripping roller H⁵ is rotatably mounted. Mounted in that end of the arm remote from the fork H¹ and constituting an extension of the same, is a handle H⁶. That end of the handle which enters the arm is carried through the length of the slot H² and this part is screw-threaded and engages the block H³. The handle is free to turn about its longitudinal axis finding a bearing in the arm at H⁷ and H⁸. A shoulder H⁹ on it prevents displacement toward the forked end of the arm and a collar H¹⁰ which lies within the slot H² of the arm prevents displacement in the reverse direction. The arm carries a second handle H¹¹ that projects from the arm at right angles to the handle H⁶. The operation of this device is as follows:—After detaching the ring G⁴ on one side of the "former" the forked end H¹ of the arm is made to engage the hub G² of the "former," and the lip $h$ of the roller H⁵ is brought to bear upon the edge of the material in close proximity to the ring G⁴, as shown in Fig. 4. The handle H⁶ is then rotated in such direction as to advance the block H³ farther from the hub G² so that the lip $h$ of the roller, and the side of the roller, are made to bear against the material with sufficient force to displace it, as shown in dotted lines at $f$. The displacement of the material causes a similar displacement of the pins whereby they are withdrawn from the ring G⁴ sufficiently to allow the ring to be readily removed. To withdraw all the pins around the whole circumference of the "former," the arm H is swung upon its forked end so that the roller H⁵ traverses the whole edge of the tire and by means of its lip $h$ detaches the same with the pins F² from the "former," that is, from the ring G⁴ which constitutes part of the "former."

What I claim as my invention and desire to secure by Letters Patent is:—

1. In mechanism for manufacturing tires that are built up of lengths of material looped over pins, the combination of, a roller, a support whereby the tire material is held in such relation to the roller that the lip or edge of the latter may bear upon the material close to the pins, means for causing the roller to exert pressure against the material in a direction approximately parallel to the axial line of that part of the pins that is disposed on the side to which thrust is applied, and means for causing the roller to traverse the edge of the tire material beside the pins, substantially as set forth.

2. In mechanism for manufacturing tires that are built up of lengths of material looped over pins, the combination of, a roller, a movable support whereby the tire material is so presented to the roller that the lip or edge of the latter may bear upon the material close to the pins, means for effecting relative movement between said roller and support to press the material home upon the pins, and means for causing the roller to traverse the edge of the tire material beside the pins, substantially as set forth.

3. In mechanism for manufacturing tires that are built up of lengths of material looped over pins, the combination of, a roller, a circular rotatable support whereby the tire material is so presented to the roller that the lip or edge of the latter may bear upon the material close to the pins, means for effecting relative movement between the roller and said support so that the material is gripped between them close to the pins, and means for rotating the roller and thereby the material on its rotatable support so that the roller traverses the edge of the tire material beside the pins, substantially as set forth.

4. In mechanism for manufacturing tires that are built up of lengths of material looped over pins, the combination of, a roller that affords a divided face so that two opposed lips or edges are presented to the material, a support whereby the tire material is so presented to the roller that the lips or edges of the latter may bear upon the material close to the pins, means for effecting a relative movement between said roller and support to press the material home upon the pins, and means for causing the roller to traverse the edge of the tire material beside the pins, substantially as set forth.

5. In mechanism for manufacturing tires that are built up of lengths of material looped over pins, the combination of, a former, two rollers adapted to coöperate with said former, the working face of one roller being opposed to that of the other, means for moving one of these rollers toward the other in such direction that the working faces are brought nearer together, means for rotating one of the rollers, and gearing connecting the rollers whereby rotation of one effects rotation of the other, notwithstanding the variation of distance between them effected by the adjustment aforesaid.

6. In mechanism for manufacturing tires that are built up of lengths of material looped over pins, the combination of, a rotatable former, two pressure rollers, the working face of one of which is opposed to that of the other, a pivoted arm whereby one roller is supported, means for swinging this arm to advance its roller toward the opposed roller whereby the tire material that is introduced between the rollers on the rotatable former may be pressed on opposite sides by the rollers the relative positions of the parts being such that the rollers bear upon the material close to the pins, means for rotating one of the rollers, and gear wheels that connect this roller with the opposed roller one of the gear wheels being so situated that its axis is in line with that of the pivot whereon the movable supporting arm swings, substantially as set forth.

7. In mechanism for manufacturing tires that are built up of lengths of material looped over pins, the combination of, a removable support or former for a tire, a roller adapted to coöperate with said support whereby the tire material may be held in such relation to the roller that the lip or edge of the latter may bear upon the tire close to the pins, means for advancing the roller toward the support in such direction that the lip of the roller is thrust against the material upon the support in a direction parallel to the axial line of the sections of the pins that engage the material, and means for causing the roller to traverse the edge of the tire material beside the pins substantially as set forth.

8. In mechanism for manufacturing tires that are built up of lengths of material looped over pins, the combination of, a removable support for a tire, a roller adapted to coöperate with said support whereby the tire material may be held in such relation to the roller that the lip or edge of the latter may bear upon the tire close to the pins, a portable frame for the roller, means for advancing the roller on the frame in such direction that the lip of the roller is thrust against the material when presented on the coöperating support in a direction parallel to the axial line of the sections of the pins that engage the material, and means for causing the roller to traverse the edge of the tire material beside the pins, substantially as set forth.

9. In mechanism for manufacturing tires that are built up of lengths of material looped over pins, the combination of, a support for a tire, a roller adapted to coöperate with said support whereby the tire material may be held in such relation to the roller that the lip or edge of the latter may bear upon the tire close to the pins, a portable frame for the roller, means for advancing the roller on the frame in such direction that the lip of the roller is thrust against the material when presented on the coöperating support in a direction parallel to the axial line of the sections of the pins that engage the material, means for causing the roller to traverse the edge of the tire material beside the pins, a pivoted foot-plate for the portable support, and a yielding control that normally lifts the foot-plate from the ground but permits the latter to be depressed into contact with the ground, substantially as and for the purpose set forth.

In testimony whereof I have signed my name to this specification in the presence of two subscribing witnesses.

THOMAS SLOPER.

Witnesses:
H. PARSONS,
W. J. TYTHERLEIGH.